(12) United States Patent
Dehmlow

(10) Patent No.: US 6,388,821 B1
(45) Date of Patent: May 14, 2002

(54) LENS-BASED IMAGE REVERSION SYSTEM

(75) Inventor: Brian P. Dehmlow, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/620,736

(22) Filed: Jul. 20, 2000

(51) Int. Cl.⁷ .............................. G02B 13/00
(52) U.S. Cl. .................. 359/744; 359/784; 359/716
(58) Field of Search ..................... 359/744, 784–785, 359/792, 710, 708, 716

(56) References Cited

U.S. PATENT DOCUMENTS 4,171,888 A * 10/1979 Shono et al. ............... 396/384
4,226,515 A * 10/1980 Plummer ................... 396/207
5,481,324 A * 1/1996 Sekine ...................... 396/354

* cited by examiner

*Primary Examiner*—Jordan M. Schwartz
(74) *Attorney, Agent, or Firm*—Nathan O. Jensen; Kyle Eppele

(57) ABSTRACT

An apparatus for correcting a reverted image is disclosed. The apparatus includes first, second, and third axially aligned lenses. The first and third lenses each have a first focal length in a first plane and a second focal length in a second plane that is orthogonal to the first plane. The second lens is disposed between and coaxially aligned with the first and third lenses. The second lens has a third focal length in the first plane and a fourth focal length in the second plane. The reverted image passes through the first, second, and third lenses and is reversed along one of the first and second planes to thereby correct the reverted image.

12 Claims, 3 Drawing Sheets

LENS-BASED IMAGE REVERSION SYSTEM

FIELD OF THE INVENTION

The present invention relates to optical imaging systems, and more particularly, to correcting reverted optical images.

BACKGROUND OF THE INVENTION

Optical imaging systems that include an odd number of mirror or prism reflections produce reverted images. A reverted image is rotated 180 degrees about a first axis, such as a horizontal axis, but is not rotated about a second axis that is orthogonal to the first axis, such as a vertical axis. The familiar "mirror image" one observes when looking at a mirror is an example of a reverted image. A "mirror image" is rotated about a vertical axis but is not rotated about a horizontal axis that is coplanar with and orthogonal to the vertical axis. In the same manner, the reflection off the surface of a body of water is rotated about a horizontal axis but is not rotated about a vertical axis. Such a "pond reflection" is also a reverted image. In some applications, such as in avionics displays, it may be necessary to correct such an image reversion.

In contrast to a reverted image, an inverted image is one that is reverted in both axes when viewed. For example, an astronomical telescope usually presents an inverted image that is reversed in both horizontal and vertical axes. An inverted image appears to be rotated 180 degrees about the optical axis, which is perpendicular to both the horizontal and vertical axes of the image. Inverted images are corrected by known "erecting" prisms or lenses.

Reverted images can be corrected by introducing a second reversion that cancels the original reversion. Known reversion correction systems use prisms or systems of planar mirrors to create the second reversion. However, prisms are difficult to fabricate, heavy, and introduce image aberrations when used with converging or diverging beams. On the other hand, mirror systems are difficult to maintain in alignment, especially in high-vibration environments. Some prisms and mirror systems also introduce lateral offsets in beam position, changes in beam direction, and/or rotation about the optical axis. These effects diminish image quality and render the systems unsatisfactory for some uses absent additional corrective components.

It is therefore an object of the invention to provide a way to correct a reverted image without using prisms or mirrors.

It is another object of the invention to correct a reverted image using easily manufactured components.

It is another object of the invention to correct a reverted image in a manner that is reliable in high-vibration environments.

It is still another object of the invention to correct a reverted image such that a high-quality corrected image is provided.

It is yet another object of the invention to correct a reverted image using a minimum of space.

A feature of the invention is the use of a plurality of coaxially aligned lenses to focally or afocally correct a reverted image.

An advantage of the invention is that a smaller, more reliable reversion corrector is provided that produces a high-quality corrected image without additional corrective components.

SUMMARY OF THE INVENTION

The invention provides an apparatus for correcting a reverted image. The apparatus includes first, second, and third axially aligned lenses. Each of the first and third lenses have a first focal length in a first plane and a second focal length in a second plane that is orthogonal to the first plane. The second lens is disposed between and coaxially aligned with the first and third lenses. The second lens has a third focal length in the first plane and a fourth focal length in the second plane. The reverted image passes through the first, second, and third lenses and is reversed along one of the first and second planes to thereby correct the reverted image.

In another aspect of the invention, an apparatus is provided that afocally corrects a reverted image that is projected from a first location along an optical path to a second location. The apparatus includes first, second and third lenses coaxially aligned along the optical path. Each of the first and third lenses are convex in a first plane and in a second plane that is orthogonal to the first plane. The second lens is disposed equidistant from and coaxially aligned with the first and third lenses along the optical path. The second lens is concave in the first plane and is planar in the second plane. The reverted image passes through the first, second, and third lenses and is reversed along the second plane to thereby afocally correct the reverted image.

The invention also provides a method of correcting a reverted image in a display system. According to the method, a first convex lens and a second convex lens are axially aligned along an optical path. A third lens is axially aligned between the first and second lens and along the optical path. The third lens has a finite focal length in a first plane and an infinite focal length in a second plane that is orthogonal to the first plane. A reverted image is projected along the optical path. The reverted image is reversed by at least one of the first, second and third lenses in one of the first and second planes to thereby correct the reverted image.

DETAILED DESCRIPTION OF THE DRAWINGS

Figure 1:
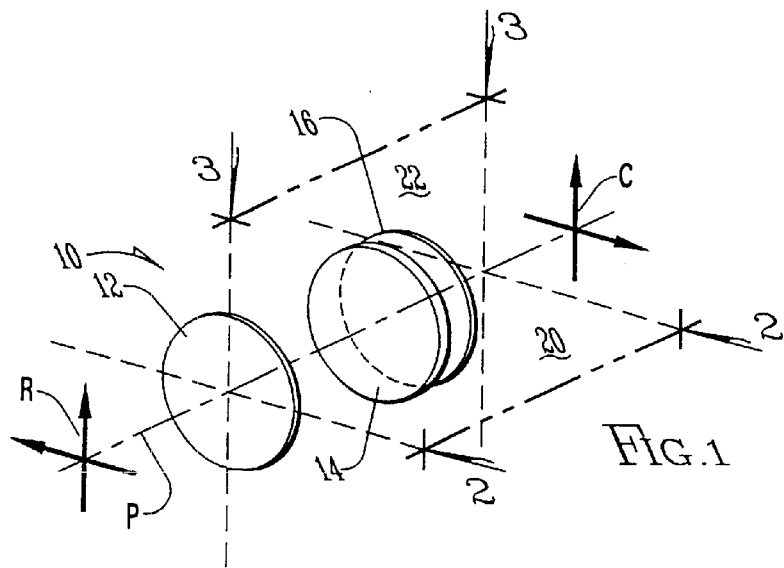
FIG. 1 is a perspective view showing a simplified representation of the present invention.

FIG. 1 shows a system or apparatus 10 that corrects an optically reverted image R according to the invention. System 10 is a general representation of the invention, and each subsequently disclosed embodiment will refer to the general arrangement shown in FIG. 1. System 10 includes a first lens 12, a second lens 14, and a third lens 16 disposed along an optical path P between reverted image R and the corrected image C. Second lens 14 is placed between first and third lenses 12, 16. First and second orthogonal planes 20, 22 intersect along optical path P. First plane 20 is depicted as a horizontal plane and second plane 22 is depicted as a vertical plane. The terms "horizontal" and "vertical" are used for conveniently describing the invention, it being understood that first and second planes 20, 22 may have any orientation as long as they are orthogonal to one another.

Figure 2:
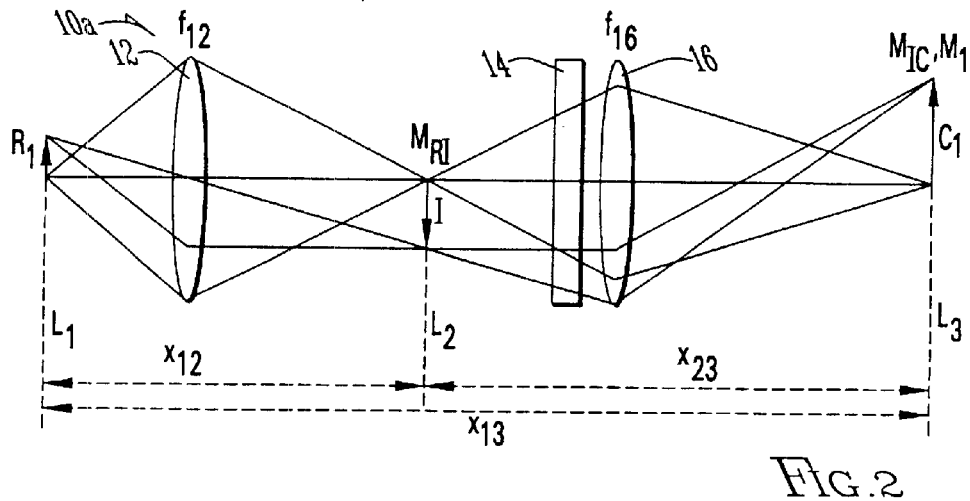
FIG. 2 is a side elevational view of a focal reverter according to an embodiment of the invention.
Figure 3:
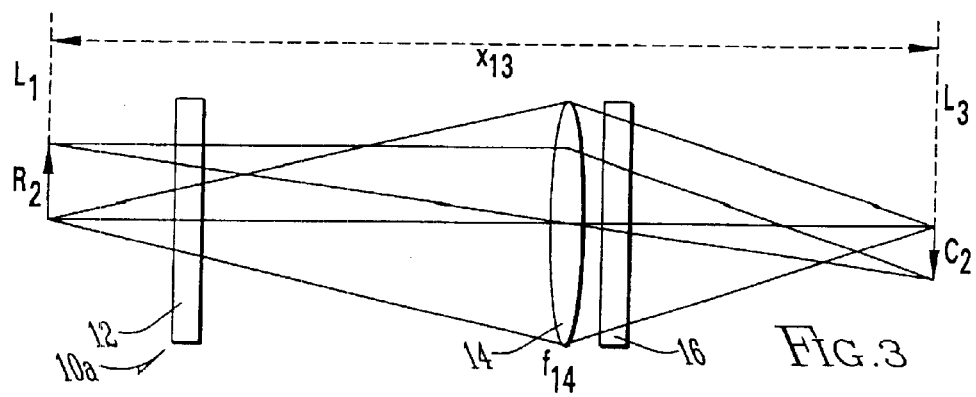
FIG. 3 is a top plan view of the focal reverter shown in FIG. 2.

One way of correcting a reverted image is to use a focal correction system, which is shown in FIGS. 2 and 3 and is shown generally at 10a. Focal system 10a starts with a real object or image as its input, and produces a real image as its output. Therefore, both reverted image R and corrected image C are real images. Reverted image R can be decomposed into first and second orthogonal image components $R_1$ (FIG. 2) and $R_2$ (FIG. 3). As shown in FIG. 2, which depicts the lenses in vertical plane 22 as seen from line 2—2 in FIG. 1, first and third lenses 12, 16 are cylindrical in form with positive power in vertical plane 22. Second lens 14 is also cylindrical in form and has zero power in the vertical plane. In other words, second lens 14 has an infinite focal length in the vertical plane. As shown in FIG. 3, which depicts the lenses in horizontal plane 20 as seen from line 3—3 in FIG. 1, first and third lenses 12, 16 have zero power, and therefore infinite focal lengths, in the horizontal plane. Second lens 14 has positive power in the horizontal plane.

Focal system 10a corrects reverted image R as follows. Reverted image R is positioned at a first location $L_1$ and corrected image C is desired to be positioned at a third location $L_3$. The distance between first location $L_1$ and third location $L_3$ is shown as $x_{13}$. In vertical plane 22 (FIG. 2), first lens 12 creates an intermediate image I at a second or intermediate location $L_2$. Intermediate image I is a reverted real image of first reverted image component $R_1$. The intermediate image has a magnification $M_{RI}$, with respect to first corrected image component $R_1$. Any value for magnification $M_{RI}$ that is less than zero is permitted. The distance $x_2$ between first and second locations $L_1$ and $L_2$, the focal length $f_{12}$ of first lens 12, and magnification $M_{RI}$ are selected as desired to satisfy the familiar Gaussian thin lens formula. Second lens 14 has an infinite focal length in the vertical plane and therefore has minimal effect on image formation in the vertical plane. Any effects are limited to a slight change in optical path length and to the generation of higher order aberrations. Third lens 16 creates a first corrected image component $C_1$ at third location $L_3$. First corrected image component $C_1$ is a reverted real image of intermediate image I, and therefore is also an erect image of first image component $R_1$. First corrected image component $C_1$ has a magnification $M_{IC}$ with respect to the intermediate image, and any value for magnification $M_{IC}$ that is less than zero is permitted. The distance $x_{23}$ between a second and third locations $L_2$ and $L_3$, the focal length $f_{16}$ of third lens 16, and magnification $M_{IC}$ are selected as desired to satisfy the Gaussian thin lens formula. The combination of optical effects produced by first and third lenses 12, 16 in the vertical plane provides first corrected image component $C_1$ with a magnification $M_1$ with respect to first reverted image component $R_1$, wherein magnification $M_1$ is determined by multiplying magnifications $M_{RI}$ and $M_{IC}$.

In horizontal plane (FIG. 3), first and third lenses 12, 16 have minimal effect on image formation. Such minimal effects are limited to slight changes in optical path length and to the generation of higher order aberrations. Second lens 14, meanwhile, creates a second corrected image component $C_2$ at third location $L_3$. Second corrected image component $C_2$ is a reverted real image of second reverted image component $R_2$. Second corrected image component $C_2$ has a magnification $M_2$ with respect to second reverted image component $R_2$, and any value for magnification $M_2$ less than zero is permitted. Both the focal length in the horizontal plane $f_{14}$ of second lens 14 and magnification $M_2$ are selected as desired to satisfy the Gaussian thin lens formula. Focal system 10a thereby corrects reverted image R using the optical effects of the first, second, and third lenses.

Figure 4:
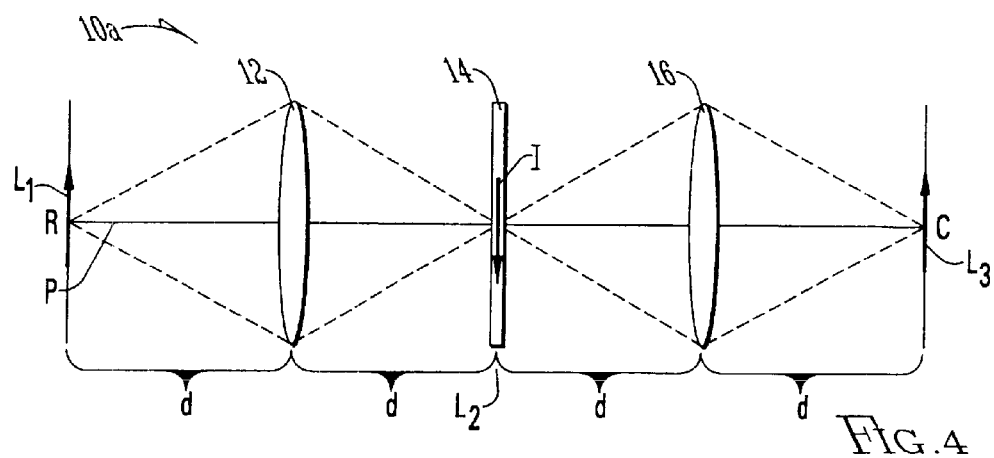
FIG. 4 is a side elevational view of a focal reverter according to another embodiment of the invention.
Figure 5:
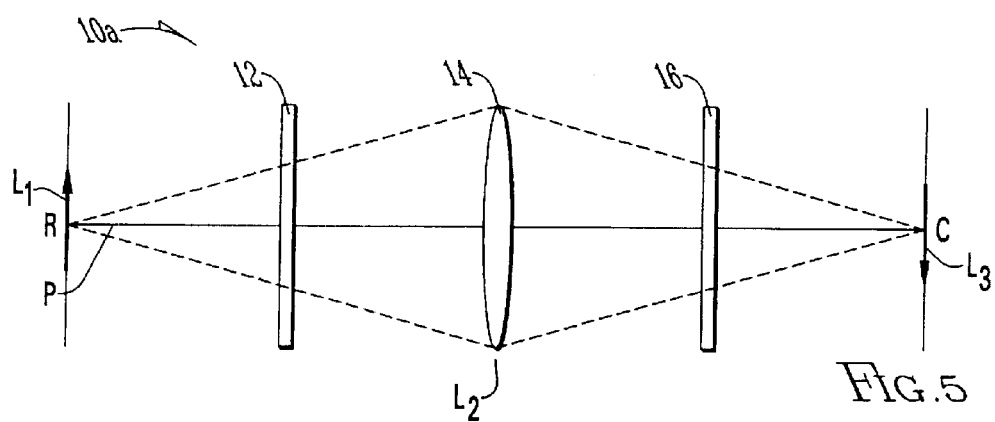
FIG. 5 is a top plan view of the focal reverter shown in FIG. 4.

As stated above, focal lengths $f_{12}$, $f_{14}$, $f_{16}$, magnifications $M_{RI}$, $M_{IC}$, and $M_2$, and distances $x_{12}$ and $x_{23}$ may be varied as desired provided the thin lens formula is satisfied. For instance, the focal lengths may be chosen to achieve desired values for distances $x_{12}$ and $x_{23}$ (and therefore $x_{13}$). The simplest case of focal system 10a is where magnifications $M_{RI}$, $M_{IC}$ and $M_2$ all equal −1. The value of focal lengths $f_{12}$ and $f_{16}$ are equal, and the value of focal length $f_{14}$ is twice that of focal length $f_{12}$. In such a system the distance between first location $L_1$ and third location $L_3$ is eight times the value of focal lengths $f_{12}$ and $f_{16}$. Distances $x_{12}$ and $x_{13}$ are equal to four times the value of focal lengths $f_{12}$ and $f_{16}$. First lens 12 is equidistant from first reverted image component $R_1$ and Image I. Second lens 14 is equidistant from first reverted image R and corrected image C. Third lens 16 is equidistant from image I and corrected image C. FIGS. 4 and 5 depict a focal system 10a according to the above parameters. FIG. 4, which is a view similar to that of FIG. 2, shows that first, second and third lenses 12, 14, 16 are arranged between reverted image R and corrected image C. The distance d between reverted image R and first lens 12 is the same as the distance between third lens 16 and corrected image C. Second lens 14 is interposed halfway between reverted image R and corrected image C. In the present embodiment, the focal lengths and magnifications of the lenses have been selected such that the lenses are spaced at equal increments between the reverted image and the corrected image. Second lens is therefore interposed the distance d from both first and third lenses 12, 16. The total distance between first location $L_1$ and third location $L_3$ is 4d.

First and third lenses 12, 16 have positive optical power with focal lengths of d/2 in the vertical plane. Second lens 14 is also cylindrical in form and has zero optical power in the vertical plane, and therefore has an infinite focal length in the vertical plane. FIG. 5, which is a view similar to that in FIG. 3, shows that first and third cylindrical lenses 12, 16 have zero optical power in the horizontal plane, and therefore have infinite focal lengths in that plane. Second cylindrical lens 14 has positive optical power with a focal length of d in the horizontal plane.

In operation, reverted image R, positioned at first location $L_1$, passes sequentially through first, second, and third lenses 12, 14, 16 respectively. As shown in FIG. 4, first lens 12 reverses the reverted image in the vertical plane, and forms in intermediate image I at second location $L_2$. Third lens 16 reverses the intermediate image I to form corrected image C at third location $L_2$. The double reversions provided by first and third lenses 12 and 16 result in the same vertical image orientation at reverted image R and corrected image C. Second lens 14 does not substantially affect the reverted image in the vertical plane. Therefore, in the vertical plane the image orientation remains unchanged after passing through first, second, and third lenses 12, 14, 16, respectively.

In the horizontal plane (FIG. 5), first and third lenses 12, 16 do not substantially affect the reverted image. Instead, second lens 14 reverses the reverted image in the horizontal plane to form corrected image C at third location $L_3$. Corrected image C, positioned at third location $L_3$, is thereby reversed in one plane (the horizontal plane) and is unchanged in a second, orthogonal plane (the vertical plane).

Figure 6:
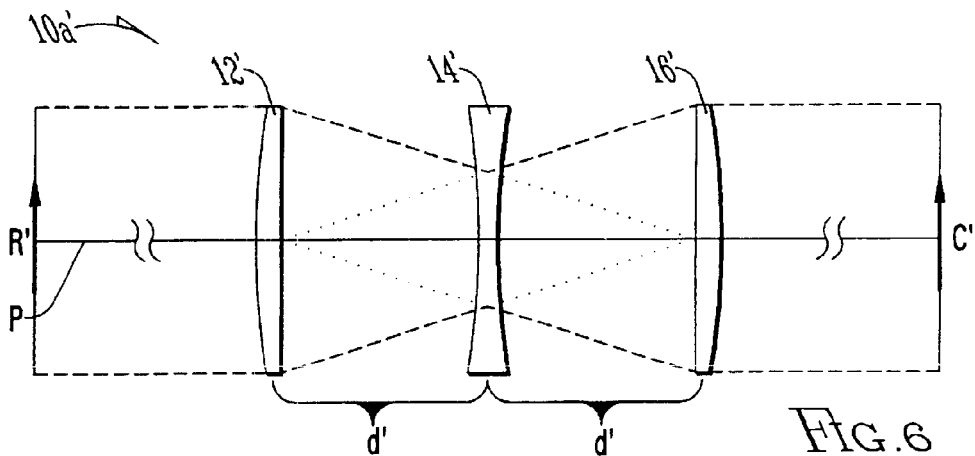
FIG. 6 is a side elevational view of an afocal reverter according to another embodiment of the invention.
Figure 7:
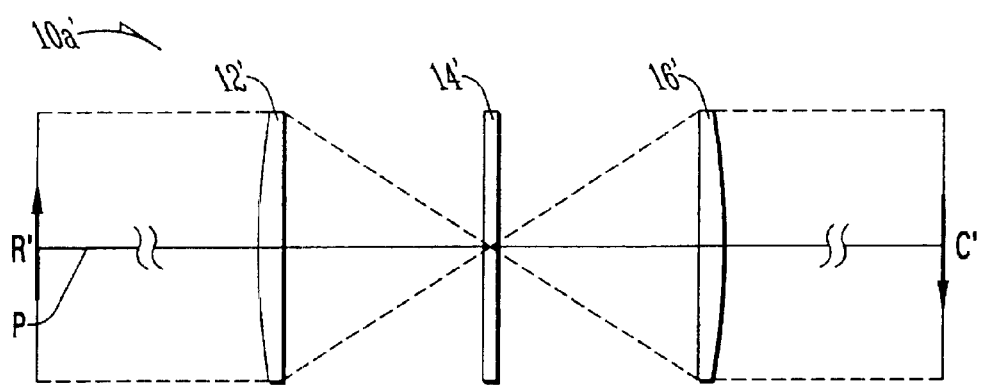
FIG. 7 is a top plan view of the afocal reverter shown in FIG. 6.

According to another embodiment, a reverted image may also be corrected using an afocal correction system 10a', as shown in FIGS. 6 and 7. The principal difference between the two embodiments is that system 10a' is designed to correct a reverted image R', which is located at an infinite distance from system 10', and project a corrected image C' at an infinite distance from system 10'. System 10' is otherwise similar in basic structure to system 10a, and similar components will therefore be designated similarly, with the addition of a prime (') symbol to the components in FIGS. 6 and 7. FIG. 6, which is a cross-section of system 10' taken at vertical plane 22 as viewed along line 2—2 in FIG. 1, shows that first, second and third lenses 12', 14', 16' are spaced at equal increments along optical path P. In other words, the distance d' between first lens 12' and second lens 14' is the same as the distance between second lens 14' and third lens 16'.

As shown in FIG. 6, first and third lenses 12', 16' are cylindrical in form and have positive optical power with focal lengths of 2d' in the vertical plane. Second lens 14' is also cylindrical in form and has negative dptical power with a focal length of −d'/2 in the vertical plane. FIG. 6, which is a cross-section of system 10' taken at horizontal plane 20 as viewed along line 3—3 in FIG. 1, shows that first and third lenses 12', 16' are cylindrical in form and have positive optical power with focal lengths of d' in the horizontal plane. Second lens 14' is a planar in the horizontal plane, and therefore has an infinite focal length.

In operation, reverted image R', positioned along optical path P, passes sequentially through first, second, and third lenses 12', 14', 16', respectively. In the vertical plane (FIG. 6), first lens 12 converges the reverted image toward second lens 14', which because of its negative optical power diverges the reverted image to its original size, without reversal, to third lens 16'. Third lens 16' focuses the image along optical path P. Reverted image R' is therefore not reversed in the vertical plane. However, in the horizontal plane (FIG. 7), first lens 12' focuses reverted image R' toward second and third lenses 14', 16'. Second lens 14' does not substantially affect the reverted image in the horizontal plane. However, because the distance between first and third lenses 12', 16' is greater than the focal length of first lens 12', the reverted image is reversed when it arrives at third lens 16'. Third lens 16' then projects corrected image C' along optical path P. The corrected image is thereby reversed in one plane (the vertical plane) and is unchanged in a second, orthogonal plane (the horizontal plane).

The embodiments disclosed above may be varied as desired. For instance, either of systems 10a or 10a' may be oriented as desired to correct a reversion in a given plane. While the focal lengths and dimensions of the disclosed embodiments are preferred, other distances and focal lengths may be used in keeping with the concepts disclosed herein. While the lenses are shown as single elements, it is understood that any of these single lenses could be replaced by groups of two or more lenses that serve the same function.

An advantage of the invention is that reverted images may be corrected without using prisms or mirror systems. This means that the disclosed reverter system is smaller than known systems and is easier to manufacture.

Another advantage of the invention is that the disclosed lens-based system is more reliable, especially in high-vibration environments.

Still another advantage is that the disclosed system provides a high-quality reverted image without the use of additional corrective components.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. An apparatus for correcting a reverted image, comprising:

first, second, and third axially aligned lenses, the first and third lenses each having the same first focal length in a first plane and the same second focal length in a second plane that is orthogonal to the first plane, the second lens being disposed between and coaxially aligned with the first and third lenses, the second lens having a third focal length in the first plane and a fourth focal length in the second plane, wherein the reverted image passes through the first, second, and third lenses and is reversed along one of the first and second planes to thereby correct the reverted image;

wherein the second and third focal lengths are infinite, and the fourth focal length is twice the value of the first focal length.

2. The apparatus of claim 1, wherein the first, second, third and fourth focal lengths are selected to provide a focal reverter system.

3. An apparatus for correcting a reverted image, comprising:

first, second, and third axially aligned lenses, the first and third lenses each having the same first focal length in a first plane and the same second focal length in a second plane that is orthogonal to the first plane, the second lens being disposed between and coaxially aligned with the first and third lenses, the second lens having a third focal length in the first plane and a fourth focal length in the second plane, wherein the reverted image passes through the first, second, and third lenses and is reversed along one of the first and second planes to thereby correct the reverted image;

wherein the fourth focal length is infinite, and further wherein the first focal length is twice the value of the second focal length.

4. The apparatus of claim 3, wherein the third focal length is negative.

5. The apparatus of claim 3, wherein the first, second, third and fourth focal lengths have values that provide an afocal reverter system.

6. An apparatus for correcting a reverted image, comprising:

first, second, and third axially aligned lenses, the first and third lenses each having the same first focal length in a first plane and the same second focal length in a second plane that is orthogonal to the first plane, the second lens being disposed between and coaxially aligned with the first and third lenses, the second lens having a third focal length in the first plane and a fourth focal length in the second plane, wherein the reverted image passes through the first, second, and third lenses and is reversed along one of the first and second planes to thereby correct the reverted image;

wherein the reverted image is situated at a first location, and wherein the apparatus focuses the corrected image to a second location, the distance between the first location and the first lens being the same as the distance between the second location and the third lens.

7. The apparatus of claim 6, wherein the second focal length is infinite.

8. The apparatus of claim 6, wherein the third focal length is infinite.

9. The apparatus of claim 6, wherein the fourth focal length is twice the value of the first focal length.

10. The apparatus of claim 6, wherein the second lens is equidistant from the first and third lenses.

11. An apparatus for afocally correcting a reverted image that is projected from a first location along an optical path to a second location, comprising:

first, second and third lenses coaxially aligned along the optical path, each of the first and third lenses being convex in a first plane and in a second plane that is orthogonal to the first plane; and wherein the second lens is disposed equidistant from and coaxially aligned with the first and third lenses along the optical path, the second lens being concave in the first plane and planar in the second plane;

wherein the reverted image passes through the first, second, and third lenses and is reversed along the second plane to thereby afocally correct the reverted image.

12. The apparatus of claim 11 wherein the first and second lenses each have the same first focal length in the first plane and the same second focal length in the second plane, and further wherein the first focal length is twice the length of the second focal length.

* * * * *